United States Patent
Lindley et al.

[15] 3,671,961
[45] June 20, 1972

[54] ANALOG TO DIGITAL CONVERTER FOR WELL LOGS

[72] Inventors: Ralph H. Lindley; Richard E. Bickham, both of Tulsa, Okla.

[73] Assignees: Pan American Petroleum Corporation, Tulsa, Okla.; Petroleum Information Corporation, Denver, Colo. ; part interest to each

[22] Filed: April 28, 1969

[21] Appl. No.: 819,872

[52] U.S. Cl. .............. 340/347 AD, 340/174.1 A, 340/347 P
[51] Int. Cl. ........................................... H03k 13/02
[58] Field of Search .................................. 340/347 A–347 D, 340/174.1 A

[56] References Cited

UNITED STATES PATENTS 3,052,800   9/1962   Miller .................................. 250/219
3,165,730   1/1965   Robinson ............................. 340/347

Primary Examiner—Maynard R. Wilbur
Assistant Examiner—Robert F. Gnuse
Attorney—Paul F. Hawley and John D. Gassett

[57] ABSTRACT

This is an analog to digital converter for use with analog data represented by an opaque curve on a translucent record medium. Means are provided to drive the record medium over an enclosure plate having three slits therein. A rotating disc rotates underneath this plate. Radial slits in this disc let light pass through the various slits in the steel plate when coincidence occurs onto a group of photoelectric cells. The light passage is changed by a base line and the opaque curve; such changes are used to obtain a digital representation of the curve at that point.

3 Claims, 4 Drawing Figures

INVENTOR.
RALPH H. LINDLEY
RICHARD E. BICKHAM
BY
*John D. Gassett*
ATTORNEY

PATENTED JUN 20 1972

INVENTOR.
RALPH H. LINDLEY
RICHARD E. BICKHAM
BY
John D. Gassett
ATTORNEY

ANALOG TO DIGITAL CONVERTER FOR WELL LOGS

BACKGROUND OF THE INVENTION

1. Field of the Invention

This invention relates to an analog to digital converter and more particularly to an apparatus for converting analog data recorded as an amplitude varying curve such as the well known oil field well log into digital values representative of the analog data.

2. Setting of the Invention

Over the years in the oil and gas industry there have been literally hundreds of thousands of well logs run in boreholes drilled in the earth throughout the world. There are many various type logs, such as the resistivity log, gamma ray, velocity log, etc. Normally to obtain each of such logs, an instrument is run vertically through a well bore to measure a selected parameter. The magnitude of the measured parameter is commonly record-d as a visual continuous curve varying with depth on a long, narrow strip of paper, the length of the strip of paper representing the depth axis of the log. In other words, the data is recorded on the paper in analog form. As is known in the art, it is becoming increasingly desirable to convert analog data, including these well logs, into digital data having finite values which can be used in digital computers.

SUMMARY OF THE INVENTION

This concerns an analog to digital converter for use with analog data represented on a translucent record medium having an opaque curve thereon. There is provided a rotating disc having slots located on lines radiating outwardly from the center of such disc. A cover plate means is provided adjacent one side of the disc and has three slits therein near its outer periphery. Two of the slits (called a first slit and a third slit) are on lines radiating outwardly from the center of the cover plate which is on a line through the center of the disc and perpendicular thereto. A second slit is on a line perpendicular to a line radiating from the center of said plate. Means are provided to move the record medium over these three slits. Above the record medium there is provided a light source. Photoelectric cells are provided below each of the three slits on the side of the rotating disc opposite the light source. Coincidence of the radial slit of the rotating disc with a first slit signals a counter to turn "on." Coincidence of the radial slit of the disc with the second slit of the plate permits a spot of light to pass therethrough. When this spot is interrupted by the opaque curve, an "off" signal is generated. The interval between the "on" and "off" is the digital representation of the analog signal at the point being scanned.

Various objects and a better understanding of the invention can be had from the following description taken in conjunction with the drawings.

DRAWINGS

DESCRIPTION OF THE PREFERRED EMBODIMENT

Figure 1:
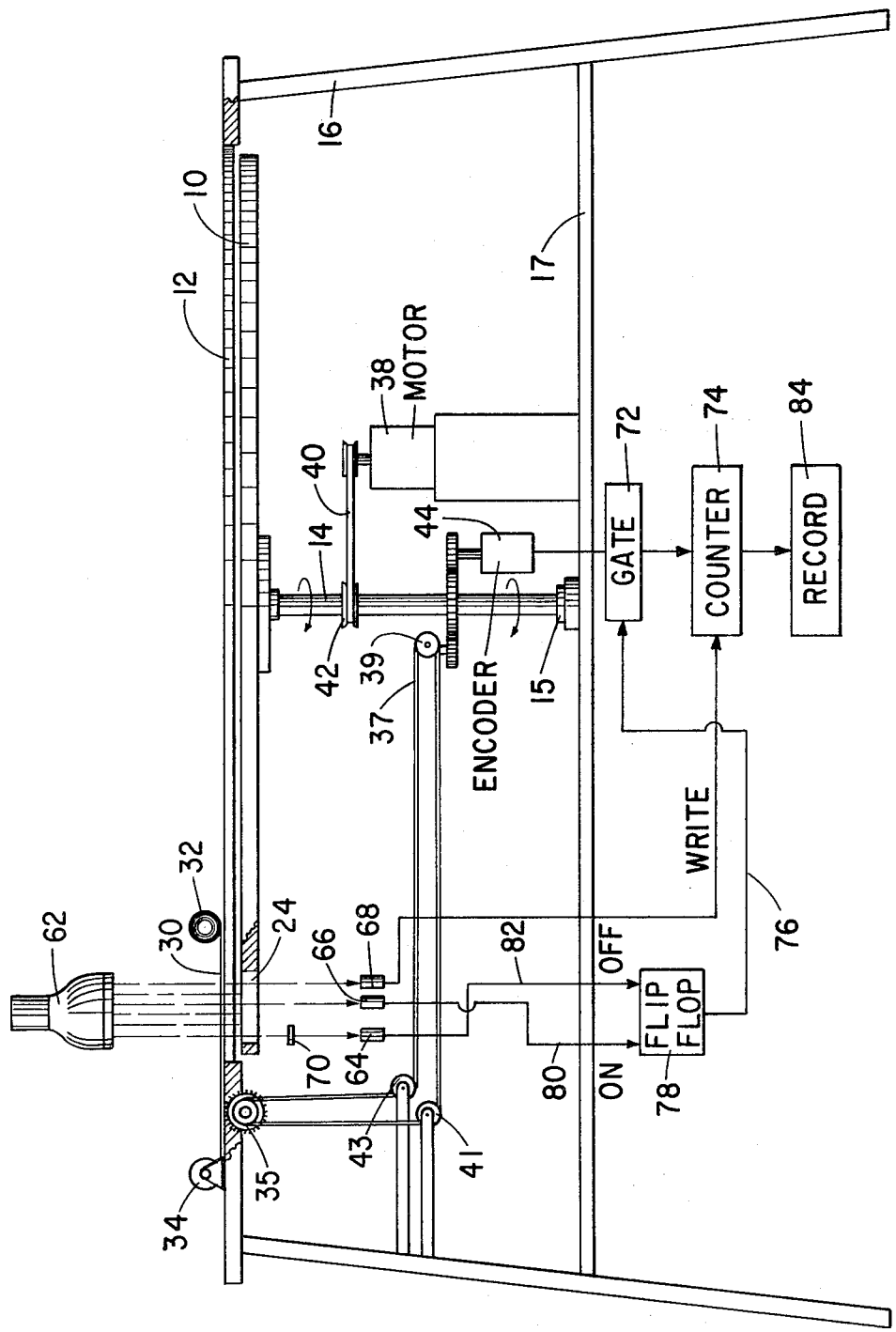
FIG. 1 is a schematic drawing of the major components of the analog to digital converter.
Figure 2:
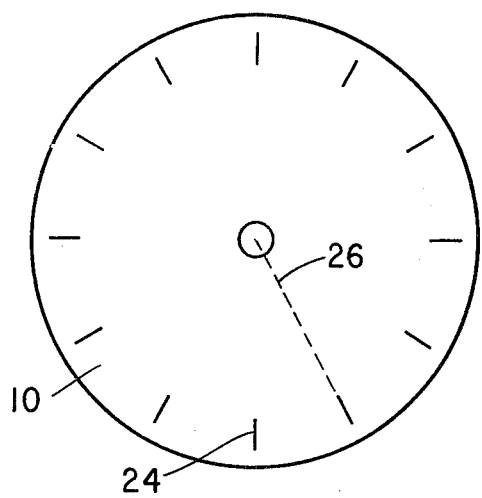
FIG. 2 illustrates a top view of the disc.
Figure 3:
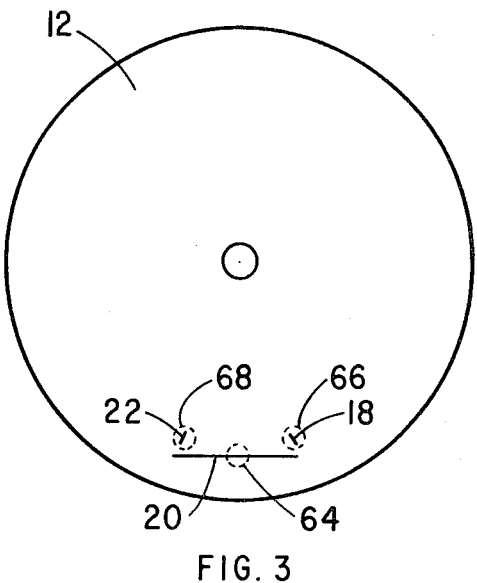
FIG. 3 illustrates a top view of the cover plate showing the slits therein.

Attention is first directed to FIG. 1 of the drawings. Shown thereon is a disc means 10 mounted below cover plate 12. Disc 10 is supported and rotated by a shaft 14. Shaft 14 and plate 12 are both supported from framework 16. An end bearing 15 supports the shaft from shelf 17. As shown in FIG. 3, plate 12 has a plurality of slots therein, there being a first slot 18, a second slot 20 and a third slot 22. As shown in FIG. 2, disc 10 has a plurality of slots 24. Slots 24 are on a radial line such as indicated by dotted line 26 from the center of the disc 10. The disc 10 is typically about 4 feet in diameter. The slits 24 are typically about 2 inches long and about 0.005 inch wide and, of course, extend through the disc. The outer ends of slits 24 are within a few inches of the periphery of disc 10. The slits 18, 20 and 22 of upper plate 12 are positioned to be adjacent the slots 24 of disc 10 as disc 10 is rotated. Slot 18 and slot 22 are on radial lines extending from the center of plate 12. The center of plate 12 for this purpose will be deemed to be adjacent the center of disc 10. Slots 18 and 22 are typically about one-half to about three-fourths inch long and about 0.005 inch wide. Slot 20 is typically about 6 inches long and about 0.005 inch wide. Slot 20 is on a line essentially perpendicular to a radial line extending from the center of slot 20 to the plate 12. Slot 18, if extended, would intercept the end of slit 20. Slit 22, if extended, would be just to the right of the end of slit 20. The relationship of these slots to the record will be discussed hereinafter.

Mounted on top of plate 12 is means for driving the record medium 30 containing the analog to be converted across the slots 18, 20 and 22 of FIG. 3. This includes a chart or record medium 30, a storage roll 32, a paper drive means 35 and paper take-up 34. These charts are preferably made of paper having perforating along the edges so that positive drive sprockets can drive these curves.

We shall now discuss the power mechanism for driving the rotating disc, the paper drive sprockets and the pulse generator. This includes a basic motor 38 whose output is mechanically coupled by a drive chain 40 to pulley 42 which is fixed to shaft 14 of the rotating disc 10. Motor 38 is supported from shelf 17. Shaft 14 is mechanically coupled to a pulse generator 44 and paper drive sprockets 35. Pulse generator 44 is conveniently a commercially available encoder which has as an output a series of pulses, the rate of such pulses being directly proportional to the rate of rotation of shaft 14 as the shaft of encoder 44 is mechanically coupled to shaft 14. Shaft 14 is also mechanically connected to drive sprockets 35 so that the paper record medium is driven at a rate directly proportional to the rate of rotation of shaft 14. This portion of the drive mechanism can include drive chain 37 and gear 39 driven by power taken by direct mechanical coupling from shaft 14. Endless chain 37 is also guided by sheaves 41 and 43 which are supported from frame 16. It is thus seen that the rotation of disc 10, the rate of movement of record medium 30 and the rate of generation of pulses from encoder 44 are all synchronized or proportional. Thus, if the rate of rotation of disc 10 fluctuates, it does not change the accuracy of the digitizing.

Figure 4:
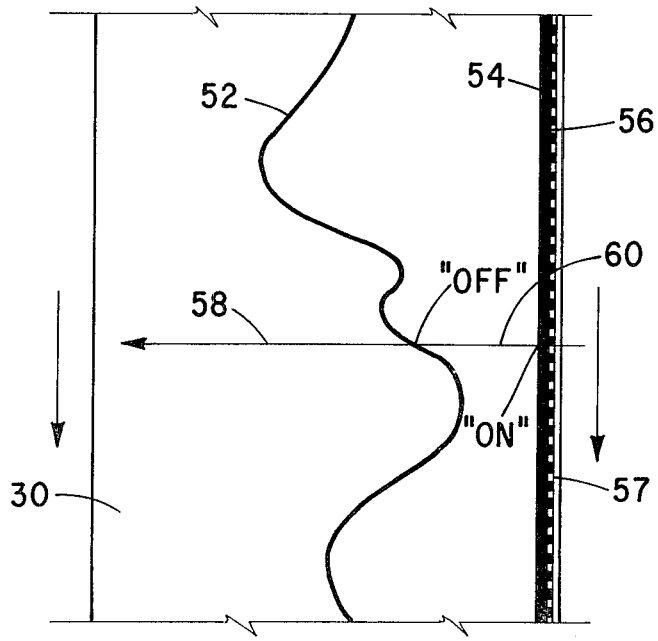
FIG. 4 illustrates a portion of an analog curve which is to be converted to digital data.

Attention is now briefly turned to FIG. 4. Shown thereon is a record medium 30 upon which is placed the curve 52. The record medium is provided with a series of sprocket holes 57. All of the record medium 30 is translucent except for line or curve 52 and margin 56, which are opaque. Shown on there is a base line 54 which is defined by the edge of the dark margin 56 or, stated differently, the boundary between the opaque margin and the translucent portion of the record medium. The direction of scan is indicated by arrow 58. For scan 58 it is desired to obtain a measure of the interval 60 which is the interval or distance between the base line 54 and the curve 52. This is a measure of the amplitude at this point.

Attention is now directed back to FIG. 1 which shows that portion of the mechanism which is directly concerned with obtaining the measure of the interval 60. There is a light source 62 directly above the record medium 30. Directly under the enclosure of disc 10 are three photoelectric cells. There is one under each of the slits 18, 20 and 22 of FIG. 3. These are photocells 64, 66 and 68 which are respectively under slots 20, 18 and 22. The horizontal position of these photocells is relative to the slits as indicated by dotted circles in FIG. 3. As slot 20 is rather long, a lens means 70 is provided between photocell 64 and slot 20 to focus any light which passes through the slot onto the surface of photocell 64.

It will be recalled that encoder 44 has a continuous output of signals directly proportional to the rate of rotation of shaft 14. It is desired to count those pulses which occur during the rotation of slit 24 between base line 54 and curve 52. Thus, we obtain a measure of that interval such as interval 60 of base line 54. We therefore start counting when base line 54 is reached and stop counting when curve 52 is reached by the scanning mechanism. We will discuss ways by which that is obtained. The output pulses from encoder 44 are connected to a gate 72. Counter 74 is any commercial counter which can count the pulses from encoder 44. Upon a "write" command, it transmits information showing the number of pulses counted and then resets itself to zero. Gate 72 is any of the well known types which is opened when it has a signal fed thereto on conductor line 76. Conductor line 76 is connected to the output of flip flop 78. Flip flop 78 is turned on and off by signal means indicating that the scanning means has encountered base line 54 and curve 52, respectively. Thus, the "on" input of flip flop 78 is connected by a conductor line 80 to photoelectric cell 66 and the "off" input to flip flop 78 is connected by line 82 to the output of photoelectric cell 64. Flip flop 78 is of a type which has a continuous output signal on line 76 when it has been turned on by a signal on the "on" input. This signal stays on until the flip flop 78 receives a signal on the "off" input, at which time the output of flip flop 78 is stopped. Thus, it is seen that gate 72 has a signal which causes it to be opened during the interval from the time in which photocell 66 gives off its first signal to the time in which photoelectric cell 64 emits its "off" signal.

Photoelectric cell 66, as stated above, is directly below slot 18. The paper or record medium 50 passes over this slot as well as the other two. The base line 54, as shown in FIG. 3, is directly over slot 18 so that a part of the slot 18 is blanked off by the dark margin 56 and a part is adjacent the translucent part of the record. The boundary between margin 56 and the translucent portion is base or reference line 54. This reference line 54 travels under slot 18. As disc 10 rotates and slot 24 becomes aligned with slot 18, light passes therethrough onto photoelectric cell 66. This causes this cell 66 to emit a signal which turns flip flop 78 "on." This flip flop will stay on until it receives an "off" signal from photocell 64. As disc 10 rotates, it passes along slot 20. This permits a point of light to pass through that portion of the two slits which are in coincidence. Photocell 64 is of a type which will emit a signal when the light to it is interrupted. This occurs when line or curve 52, as shown in FIG. 4, is encountered. When flip flop 78 receives an off signal, it no longer has an output signal. Thus, it is seen that gate 72 is open from the time at which base line 54 was encountered to the encountering of line 52. The number of pulses which were emitted during this time is independent of the time which this scanning consumed. It is dependent only on the rotation of disc 10. Thus, the number of pulses passed by gate 72 is the direct measure of the interval 60. This output of gate 72 is transmitted to a counter 74 which counts these pulses. The counter is of a type which when it receives a "write" pulse will transmit to record 84 an indication of the number of pulses counted during the counting interval. The "write" pulse is obtained from photoelectric cell 68 which emits a signal when slot 24 of disc 10 is aligned with slot 22 of plate 12.

It is seen that when disc 10 rotates there is a continuous output of signals from encoder 44 which is directly proportional to the rotation of the disc. The number of pulses generated between the encountering of the base line 54 and the curve 52 by the scanning mechanism is counted and recorded on record 84. A pulse from generator 66 turns the flip flop 78 on to permit the counter to start. Photoelectric cell 66 is of the type which has an output signal only upon the receiving of light. The flip flop stays on until it receives an "off" signal from photoelectric cell 64 which is of the type which emits a pulse when light to it is interrupted. It will be noted that light to photoelectric cell 64 will again be interrupted when the radial slit 24 of disc 10 passes beyond slit 20 of plate 12. However, this is of no concern because this will merely feed another "off" pulse to flip flop 78 and will have no effect on it. Flip flop 78 will remain off until it receives another "on" pulse indicating that another radial line or slit 24 has again encountered the base line 54. As the disc rotates it is seen that the paper or record medium 30 is also moved. Thus, each scan is for a succeedingly different depth along the well log. The interval between the digital measurement can be determined by the rate of movement of the record medium compared to the rotation of the disc. By having a known depth starting point and a known interval between each scan, the digital representation for the various intervals scanned is readily correlated with those depths.

While the above preferred embodiment has been described with a great deal of detail, it is possible for various variations therein without departing from the spirit or scope of the invention.

We claim:

1. An analog to digital converter for use with analog data represented on a record medium having a curve thereon of different optical characteristics from the record medium, there being a base line for any such curve, the combination which comprises:

a disc means, said disc means having a plurality of slits near the outer periphery thereof, said slits being located on lines radiating outwardly from the center of said disc means;

means to rotate said disc means about its center;

a plate means on one side of said disc means and adjacent thereto, said plate means having a first slit located on a line radiating outwardly from a point on said plate means which intercepts a line through the center of said disc and perpendicular thereto and a second slit near the outer edge of said plate means and which is perpendicular to a line passing through the said center of said plate means;

means to move said record medium across the outer surface of said plate means across said slits and in a direction perpendicular to said second slit and at a rate proportional to the rotation of said disc means;

a light source adjacent said slits and arranged to direct light through said record medium toward said slits;

a first photoelectric cell adjacent said first slit on the opposite side of said disc from said light source to emit an "on" signal each time said slit is in coincidence with any one of said disc slits;

a second photoelectric cell adjacent said second slit to emit an "off" signal each time said curve interrupts light directed toward said second photoelectric cell;

means to determine a measure of the interval between said "on" signal and said "off" signal; and record means to record such determined measure.

2. An apparatus as defined in claim 1 including a third slit on a line radiating outwardly from the center of said plate, the radial distance between said first slit and said third slit being sufficient to accommodate the maximum amplitude of said curve; and a third photoelectric cell adjacent said third slit and located on the opposite side of said disc from said light source for emitting a "write" signal upon light striking said third cell.

3. An apparatus as defined in claim 2 wherein said counter includes a first temporary storage means for storing the interval measured by said first measuring means, and including means to transfer the data representing the interval stored in said temporary storage means to said record means upon receiving said "write" signal from said third photoelectric cell.

* * * * *